C. E. BURWELL.
Improvement in Friction-Clutches.

No. 128,705.    Patented July 9, 1872.

Witnesses,    Inventor,

UNITED STATES PATENT OFFICE.

CHARLES E. BURWELL, OF SPRINGFIELD, MASSACHUSETTS, ASSIGNOR OF ONE-HALF OF HIS RIGHT TO MILO J. LEGG, OF SAME PLACE.

IMPROVEMENT IN FRICTION-CLUTCHES.

Specification forming part of Letters Patent No. 128,705, dated July 9, 1872.

*To all whom it may concern:*

Be it known that I, CHARLES E. BURWELL, of Springfield, in the county of Hampden and State of Massachusetts, have invented a new and useful Improvement in Friction-Pulleys; and I do hereby declare that the following is a full, clear, and exact description thereof, reference being had to the accompanying drawing making a part of this specification, and to the letters of reference marked thereon, in which—

Figure 1:
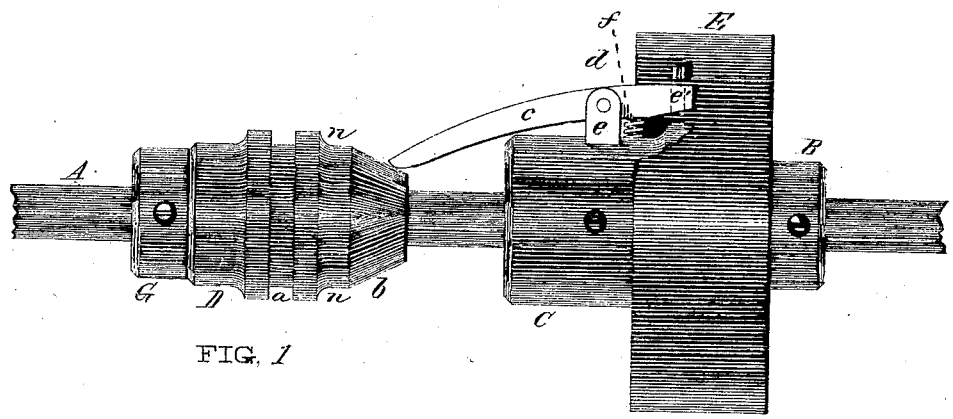
Figure 2:
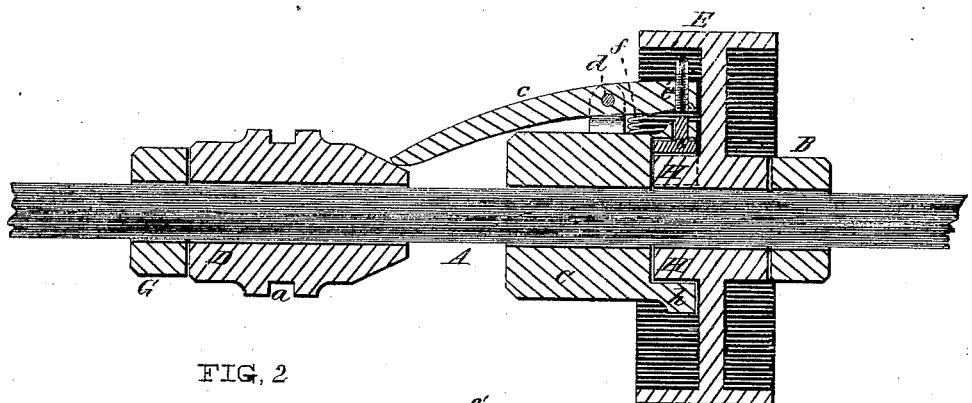
Figure 4:
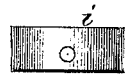
Figures 3, 5:
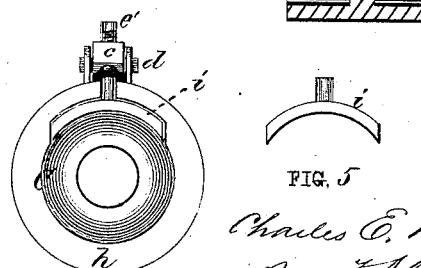

Figure 1 is a side view of my invention with a part of the pulley-flange broken away to show the position of the lever. Fig. 2 is a longitudinal section. Fig. 3 is an end view of the stationary hub; and Fig. 4 is a plan and end view of the brake-shoe.

My invention relates to a friction-pulley designed to be placed upon a countershaft; and it consists, first, of a stationary hub having a cylindrical recess in one end, leaving an annular flange upon the end of the hub, in which is formed a cavity extending a portion of the way around on the inside of said flange. A brake-shoe is made to fit said cavity, and a projection or stud projecting from the exterior surface of the shoe protrudes through a hole made in the annular flange for that purpose. An ordinary pulley, recessed on one side so as to form an annular flange to carry the belt and a central hub, is placed upon the shaft with the stationary hub, and with the hub of the pulley placed in the recess in the end of the stationary hub, and with the inner face of the brake-shoe in close proximity to the outer face of the central hub of the pulley. One or more projections are made upon the perimeter of the stationary hub, to which is pivoted a lever having a set-screw in the short arm directly over the projection of the brake-shoe. A conical clutch-collar is placed upon the shaft near the long arm of said lever, so that by sliding said collar toward the pulley the conical end of said collar passes under the end of the long arm of the lever, forcing it away from the shaft, and forcing the end of the set-screw in the short arm of the lever in upon the projection or stud of the brake-shoe, which forces the brake-shoe in upon the hub of the pulley, and making the shoe adhere by the friction to the pulley-hub H. The pulley which is running loose upon the shaft is thus made to cause the shaft to revolve with the stationary hub C attached thereto, and the shaft is then used to carry any machinery desired by means of a belt and pulley placed thereon. If the conical clutch-collar be moved from under the end of the long arm of the lever the pressure is removed from the brake-shoe, and the pulley is left loose upon the shaft again, and the shaft will not be made to revolve.

That others skilled in the art may be able to make and use my invention, I will proceed to describe its construction and operation.

In the drawing, A represents the shaft, upon which is secured firmly the hub C, making it stationary or fast upon the shaft. This hub has a recess made in one end, which leaves an annular flange, $h$, and in the inner face of this flange is made a cavity, into which is fitted the brake-shoe $i$ to move freely therein. This brake-shoe has a projection or stud thereon, which is inserted in a hole made through the flange, said stud protruding through the flange. Upon the outside of the stationary hub C is attached one or more projections, $e$, to which is pivoted a lever, $c$, its short arm extending into the recess in the side of the pulley E, and a set-screw, $e'$, in the end of the short arm of the lever, placed directly over the brake-shoe stud or projection which protrudes through the flange of the hub. A clutch-collar, D, is placed upon the shaft to slide freely thereon to and fro, and the end of said collar is made conical, as shown at $b$, and the collar is so placed upon the shaft, that, when not in use, it is in the position shown in Fig. 1. A spring, $f$, is placed under the short arm of the lever, which operates to keep the set-screw $e'$ away from the brake-shoe stud.

The operation of my invention is as follows: When the clutch-collar D is in the position shown in Fig. 1, the brake-shoe is free, and the pulley will revolve without causing the shaft to revolve with it; but if the clutch-collar D is moved along the shaft A toward the hub C the conical part $b$ of said collar passes under the end of the long arm of the lever $c$, and forces it outward from the shaft, moving the short arm toward the shaft, and forcing the set-screw $e'$ in upon the stud of the brake-shoe $i$, bringing the interior surface of the brake-shoe into firm contact with the exterior surface of the hub H of the pulley. These two surfaces being well fitted to each other an amount of friction is produced which is sufficient to cause the shaft to revolve with the pulley, and by moving the clutch-collar D away from the hub C the lever is free again, and the brake-shoe $i$ is no longer forced into firm contact with the hub of the pulley. Two of these levers and brake-shoes, or even more, if required, may be attached to the hub C without departing from the principle of operation of my invention. A collar, B, is attached to the shaft upon the side of the pulley opposite the hub C to keep the hub of the pulley properly in place within the recess in the stationary hub C. Another collar, G, may be attached to the shaft to limit the movement of the clutch-collar D. The device will operate most satisfactorily if the set-screw $e'$ be turned in so that when the clutch-collar D is moved toward the hub C to a position with the end of the long arm of the lever passed up over the conical part $b$ of the collar, and bearing on the part $n$, the maximum amount of pressure upon the brake-shoe will then be reached, and the clutch-collar will then remain in position, either in or out, without fastening; and as the inner surface of the shoe wears away by friction with the hub of the pulley, the screw $e'$ may be turned in correspondingly to keep up the uniform pressure upon the brake-shoe.

I am aware that various devices have heretofore been made and used, wherein a pivoted lever, conical collar, and brake-shoe were employed to produce friction, as shown in Letters Patent granted to James S. Brown, April 26, 1864, and others; and I do not claim the said devices, nor any part thereof; neither do I claim any arrangement of levers, collar, and brake-shoe irrespective of that herein described as my invention.

Having thus described my invention, what I claim as new, and desire to secure by Letters Patent, is—

The combination and arrangement of the conical clutch-collar D, lever $c$, set-screw $e'$, stationary hub C, brake-shoe $i$, and hub H of the pulley, all constructed and operated substantially as described.

CHARLES E. BURWELL.

Witnesses:
T. A. CURTIS,
C. E. BUCKLAND.